United States Patent
Moeller

(10) Patent No.: US 11,247,824 B2
(45) Date of Patent: Feb. 15, 2022

(54) PACKAGING AND SHIPPING SYSTEM FOR A DRY CHARGED BATTERY

(71) Applicant: Michael E. Moeller, South Milwaukee, WI (US)

(72) Inventor: Michael E. Moeller, South Milwaukee, WI (US)

( * ) Notice: Subject to any disclaimer, the term of this patent is extended or adjusted under 35 U.S.C. 154(b) by 248 days.

(21) Appl. No.: 15/619,824

(22) Filed: Jun. 12, 2017

(65) Prior Publication Data

US 2017/0355506 A1 Dec. 14, 2017

Related U.S. Application Data

(60) Provisional application No. 62/349,321, filed on Jun. 13, 2016.

(51) Int. Cl.
*B65D 77/26* (2006.01)
*B65D 19/18* (2006.01)
(Continued)

(52) U.S. Cl.
CPC ............... *B65D 77/26* (2013.01); *B65D 5/42* (2013.01); *B65D 19/14* (2013.01); *B65D 19/18* (2013.01);
(Continued)

(58) Field of Classification Search
CPC .... B65D 77/26; B65D 77/04; B65D 77/0426; B65D 77/0413; B65D 77/042;
(Continued)

(56) References Cited

U.S. PATENT DOCUMENTS 1,938,214 A * 12/1933 Boeye ..................... H01M 6/44
206/705
2,452,049 A 10/1948 Hauck
(Continued)

OTHER PUBLICATIONS

Arctic Cat Service, "AGM Battery Activation and Initial Charge", YouTube, May 27, 2015, pp. 1-1, retrieved from the Internet on Jul. 20, 2017, https://www.youtube.com/watch?v=jL9COQwseEg.
(Continued)

*Primary Examiner* — Robert Poon
(74) *Attorney, Agent, or Firm* — Andrus Intellectual Property Law, LLP

(57) ABSTRACT

A packaging and shipping system for dry charged batteries. The packaging system includes a shipping crate having a lower section that defines an open interior. The open interior is sized to receive a dry charged battery and a plurality of electrolyte bottles. Each of the electrolyte bottles contains a volume of electrolyte sufficient to fill one of the individual cells of the dry charged battery. Each of the electrolyte bottles are separately packaged and positioned within the open interior of the shipping crate. Upon reaching the desired destination, the shipping crate can be stored. When the dry charged battery is to be placed into use, the shipping crate is opened and the individual cells of the dry charged battery are filled with electrolyte from the plurality of electrolyte bottles. Once the dry charged battery has been activated, the empty electrolyte bottles can be placed back into the shipping crate and returned for recycling.

7 Claims, 2 Drawing Sheets

(51) Int. Cl.
  *B65D 77/04* (2006.01)
  *B65D 19/14* (2006.01)
  *B65D 19/20* (2006.01)
  *B65D 77/24* (2006.01)
  *B65D 5/42* (2006.01)
  *G06Q 10/08* (2012.01)
  *H01M 6/32* (2006.01)

(52) U.S. Cl.
  CPC ............ *B65D 19/20* (2013.01); *B65D 77/042* (2013.01); *B65D 77/0426* (2013.01); *B65D 77/0453* (2013.01); *B65D 77/24* (2013.01); *G06Q 10/0837* (2013.01); *B65D 2519/00019* (2013.01); *B65D 2519/00029* (2013.01); *B65D 2519/00034* (2013.01); *B65D 2519/00054* (2013.01); *B65D 2519/00064* (2013.01); *B65D 2519/00069* (2013.01); *B65D 2519/0081* (2013.01); *B65D 2519/00159* (2013.01); *B65D 2519/00169* (2013.01); *B65D 2519/00174* (2013.01); *B65D 2519/00194* (2013.01); *B65D 2519/00203* (2013.01); *B65D 2519/00208* (2013.01); *B65D 2519/00333* (2013.01); *B65D 2519/00621* (2013.01); *B65D 2519/00666* (2013.01); *B65D 2519/00711* (2013.01); *B65D 2577/043* (2013.01); *B65D 2585/88* (2013.01); *G06Q 10/0832* (2013.01); *H01M 6/32* (2013.01)

(58) Field of Classification Search
  CPC .......... H01M 6/32; H01M 6/385; H01M 6/38; H01M 10/04; H01M 2/1022; H01M 2/105

USPC ................................................. 206/705, 703
  See application file for complete search history.

(56) References Cited

U.S. PATENT DOCUMENTS 2,713,080  A        7/1955  Barrett
  3,056,536  A  *    10/1962  Smith ................... B65D 5/5014
                                                        206/521
  3,483,041  A  *    12/1969  Kalen ..................... H01M 6/32
                                                        206/223
  3,765,527  A  *    10/1973  Vargo .................. B65D 5/48002
                                                        206/223
  5,911,323  A  *     6/1999  Bapst .................... B65D 77/042
                                                        206/446
  2001/0052479 A1*   12/2001  Gaffney ............... B65D 43/162
                                                        206/704
  2007/0251858 A1*   11/2007  Martinez ............ B65D 5/48032
                                                        206/703
  2015/0118125 A1*    4/2015  Hasegawa .......... B65D 77/0426
                                                        422/430

OTHER PUBLICATIONS

Remy Battery, "FreshStart Dry Charged Battery Packaging Solution", YouTube, Feb. 15, 2017, pp. 1-1, retrieved from the Internet on Jul. 20, 2017, https://www.youtube.com/watch?v=1csnAFJQtFI.
International Search Report and Written Opinion for PCT/US2017/036962, dated Aug. 2, 2017.
International Preliminary Report on Patentability for International Application PCT/US2017/036962 dated Dec. 27, 2018.

* cited by examiner

PACKAGING AND SHIPPING SYSTEM FOR A DRY CHARGED BATTERY

CROSS REFERENCE TO RELATED APPLICATION

The present application is based on and claims priority to U.S. Provisional Patent Application Ser. No. 62/349,321 filed on Jun. 13, 2017, the disclosure of which is incorporated herein by reference.

BACKGROUND

The present disclosure generally relates to a packaging and shipping system for dry charged batteries. More specifically, the present disclosure relates to a system and method for packaging dry charged batteries, including individual bottles of electrolyte needed to activate the battery, in a convenient shipping container.

Presently, dry charged batteries exist that include a battery shell that define a plurality of battery cells. The dry charged battery is shipped without electrolyte. When the battery is placed into service, the individual cells of the dry charged battery is filled with electrolyte and charged. Batteries of this type have a long shelf life since the electrolyte is placed into the battery shell at the time the battery is put into use.

Although dry charged batteries can be stored for a long time before being filled with electrolyte, large volumes of electrolyte must be shipped to storage/charging locations where the dry charged batteries are filled with the electrolyte prior to being placed into use. The electrolyte is typically some type of acid, which is classified as a hazardous liquid. Dry charged batteries are typically filled from a large container of electrolyte, which creates storage issues, transportation issues and filling issues. Specifically, the acid that is used to fill the battery cells must be specially shipped, which increases both the risk and cost for transporting such hazardous liquid.

Therefore, a need exists for an improved system for packaging, shipping and filling dry charged batteries.

SUMMARY

A packaging and shipping system for dry charged batteries is shown and described. The packaging system includes a shipping crate having a removable cover and a lower section that defines an open interior. The open interior is sized to receive the dry charged battery shell, which includes a plurality of individual battery cells. Each of the battery cells has a cell volume designed to receive an amount of electrolyte.

The packaging and shipping system further includes plurality of electrolyte bottles. Each of the electrolyte bottles is sized to contain a volume of electrolyte that corresponds to the cell volume. In this manner, each electrolyte bottle includes enough liquid to fill one of the individual cells within the dry charged battery shell. Each of the electrolyte bottles are separately packaged and positioned within the open interior of the shipping crate. The individual electrolyte bottles can each be contained in a plastic bag and cardboard/paperboard box within the shipping crate for further protection/containment during shipping and storage.

Upon reaching the desired destination, the shipping crate can be stored. When the dry charged battery is to be placed into use, the shipping crate is opened and the individual cells of the dry charged battery shell are filled with electrolyte from one of the plurality of electrolyte bottles. Once the dry charged battery has been activated, the empty electrolyte bottles can be placed back into the shipping crate along with the spent lead acid battery and returned for recycling.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
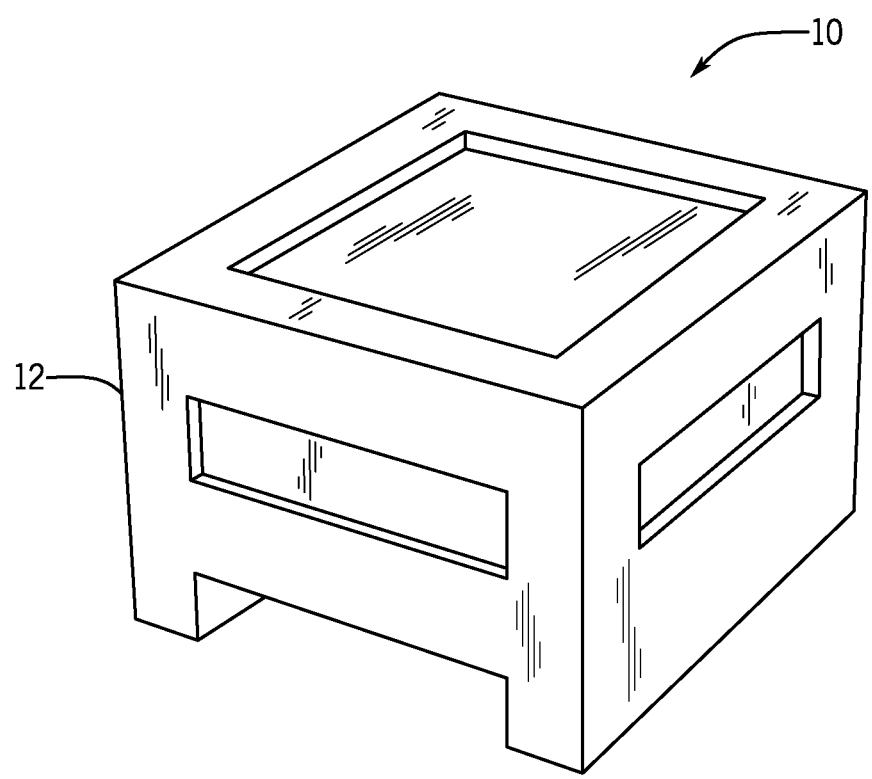
FIG. 1 is a perspective view of the shipping and packaging system of the present disclosure.

Referring first to FIG. 1, thereshown is the packaging system 10 of the present disclosure. The packaging system 10 is used to ship a single dry charged battery along with the required electrolyte to fill the individual cells of the dry charged battery. In the embodiment shown in FIG. 1, the packaging system includes a wooden shipping crate having dimensions as illustrated. The shipping crate, as better shown in FIG. 2, includes a lower section 14 and a cover 16. Although specific dimensions are shown for the shipping crate 12 in FIG. 1, it should be understood that these dimensions could vary while operating within the scope of the present disclosure. Although the shipping crate 12 is shown as being formed from wood, it should be understood that the shipping crate 12 could be formed from other durable material, such as cardboard, paperboard or plastic.

Figure 2:
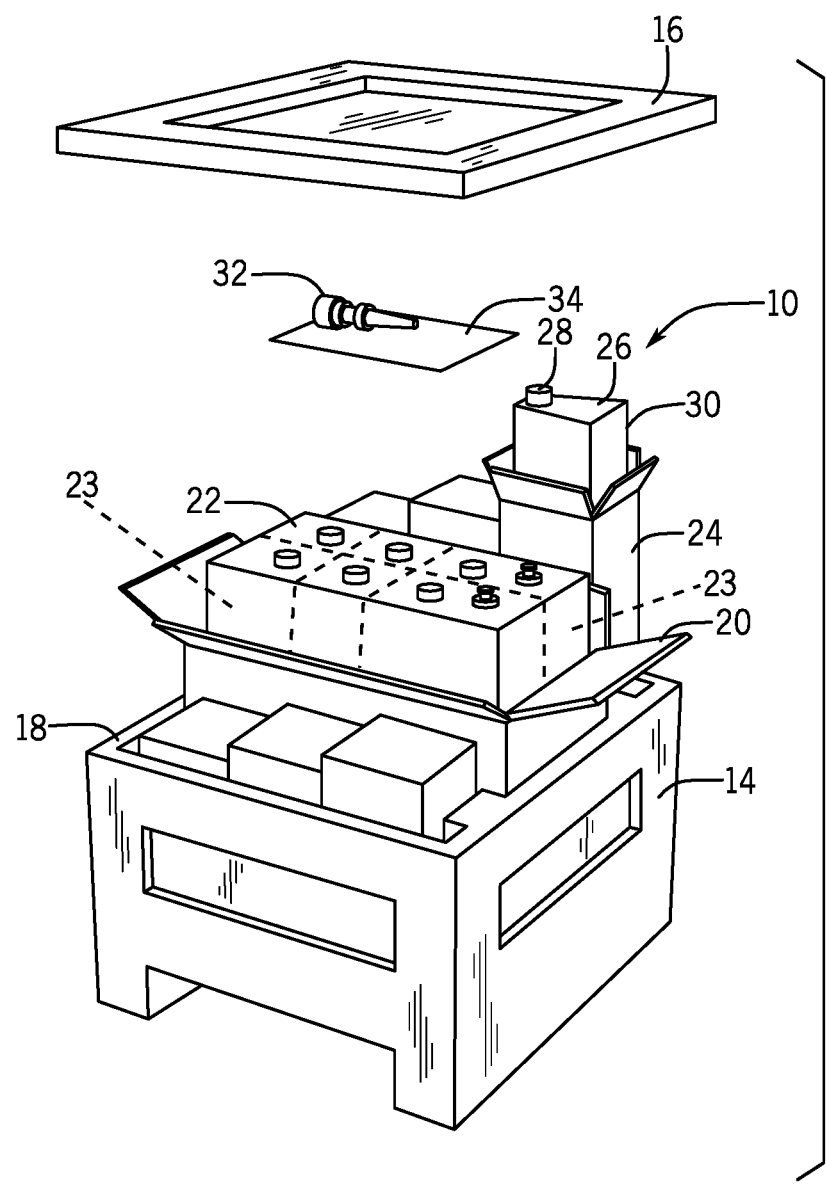
FIG. 2 is an exploded front perspective view of the packaging and shipping system showing the individual components of the dry charged battery.

Referring now to FIG. 2, the lower section 12 has an open interior 18 that is sized to receive a battery box 20 that includes the dry charged battery shell 22. In the embodiment shown in FIG. 2, the dry charged battery shell 22 is a six cell dry charged battery shell, although other sized batteries are contemplated as being within the scope of the present disclosure. Each of the plurality of cells 23 in the dry charged battery shell 22 is separate and has a cell volume, which is the volume of electrolyte needed to fill the cell. As an example, the dry charged battery shell 22 could have a cell volume of 1 liter, although other volumes are contemplated for different sized batteries. When the dry charged battery is initially shipped in the crate 12, each of the battery cells 23 in the shell 26 is empty and does not include any electrolyte.

When the dry charged battery is going to be placed into service, each of the battery cells 23 must be filled with electrolyte. During initial filling and charging of the dry charged battery, each of the six individual cells 23 within the dry charged battery shell 22 must be separately filled with electrolyte. Since each of the cells 23 has the same size and cell volume, each cell receives approximately the same volume of liquid electrolyte.

In the embodiment shown in FIG. 2, the lower section 14 of the shipping crate 12 is sized to receive six electrolyte boxes 24 that each in turn receives an electrolyte bottle 26. Each electrolyte bottle 26 is designed to have a volume that is the same as the cell volume. In this manner, each of the bottles 26 is sized to hold the required amount of electrolyte for filling one of the individual cells within the dry charged battery 22. Each of the electrolyte bottles 22 are separately packaged and positioned within the open interior of the shipping crate. The individual electrolyte bottles can each be contained in a plastic bag and the cardboard/paperboard box 24 within the shipping crate 10 for further protection/containment during shipping and storage.

Since each electrolyte bottle is a separate container having its own sealing cap 28 and body 30, most sizes of the electrolyte bottles 26 will include a volume of electrolyte that falls well below the DOT limitations for shipment of hazardous liquids and meets the exemptions for the shipments of limited quantities of battery acid in an acid pack container. Thus, the packaging system 10 allows the dry charged battery shell 22 and the six electrolyte bottles 26 to be shipped utilizing conventional shipping services, such as Federal Express or UPS.

In addition to the six individual electrolyte bottles 26 and the dry charged battery shell 22, the packaging system can also include a funnel 32, a filling and charging instruction sheet or sheets 34, safety data sheets (SDS), safety glasses, an apron and protective gloves. Thus, the packaging system 10 forms a complete unit that can be unpacked and used to initially fill the dry charged battery 22.

As described above, the packaging system 10 includes a shipping crate 12 that is sized specifically to receive the dry charged batteries and the six packaged electrolyte bottles 26. The shipping crate 12 provides for more efficient packaging, which allows for more dry charged batteries to be placed on a pallet which frees up storage space. The packaging system 10 provides a complete solution that includes everything needed to activate the dry charged battery. Since each of the electrolyte bottles 26 is of a specified volume, an exact amount of electrolyte can be loaded into each of the cells 23 of the dry charged battery. The manufacturer of the dry charged battery can thus control the amount and type of electrolyte loaded into the battery, which leads to proper activation, longer battery life and better performance.

Since each electrolyte bottle 26 includes the desired amount of electrolyte for each cell 23, there is less mess in filling each individual cell 23. Further, the funnel 32 can be specifically designed to work with the dry charged battery shell 22 and electrolyte bottles 26 included within the packaging system 10.

In accordance with the present disclosure, each of the electrolyte bottles 26 is formed from polypropylene which can be returned to the battery shipping company for recycling along with spent batteries. Other materials can be used for the electrolyte bottles 26, such as HDPE or glass. It is preferred that the material used for the bottles 26 is recyclable, but other materials could be used in alternate embodiments. The entire packaging system 10 is reverse shippable and can be used to return scrap batteries and empty electrolyte bottles for proper recycling.

As can be understood in the above disclosure, the shipping crate 12 can be designed to accommodate various different sized dry charged batteries 22 and thus different volume electrolyte bottles 26.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A packaging, shipping and storage system for a dry charged battery, comprising:
   a shipping crate including a lower section and a cover, wherein the lower section defines an open interior;
   a dry charged battery shell positioned within the open interior of the lower section, the dry charged battery shell having a top, a bottom, a pair of sidewalls and a plurality of battery cells each having a cell volume;
   a plurality of separate and independent electrolyte bottles each sized to receive a volume of liquid equal to the cell volume, wherein the plurality of electrolyte bottles are contained within the open interior of the lower section and positioned adjacent the sidewalls of the battery shell within the open interior of the lower section.

2. The system of claim 1 wherein the plurality of electrolyte bottles includes a first number of electrolyte bottles and the plurality of battery cells includes a second number of battery cells, where the first number and the second number are equal.

3. The system of claim 1 wherein the shipping crate is sealed.

4. The system of claim 1 wherein each of the electrolyte bottles is contained within a separate box.

5. The system of claim 1 wherein the dry charged battery shell is contained within a battery box received within the open interior of the lower section.

6. The system of claim 1 wherein each of the electrolyte bottles is formed from polypropylene.

7. A packaging, shipping and storage system for a dry charged battery, comprising:
   a shipping crate including a lower section and a cover, wherein the lower section defines an open interior;
   a dry charged battery shell positioned within the open interior of the lower section, the dry charged battery shell having a top, a bottom, a pair of sidewalls and a plurality of battery cells each having a cell volume;
   a plurality of separate and independent electrolyte bottles each sized to receive a volume of liquid equal to the cell volume, wherein the plurality of electrolyte bottles are contained within the open interior of the lower section and positioned adjacent the sidewalls of the battery shell within the open interior of the lower section,
   wherein the plurality of electrolyte bottles includes a first number of electrolyte bottles and the plurality of battery cells includes a second number of battery cells, where the first number and the second number are equal, and
   wherein each of the electrolyte bottles and the dry charged battery shell are contained within a separate box each received within the open interior of the lower section.

* * * * *